United States Patent [19]

Loosli

[11] Patent Number: 5,360,103

[45] Date of Patent: Nov. 1, 1994

[54] QUICK SPLICE FOR BELT CONVEYOR

[76] Inventor: Curtis G. Loosli, 311 Westmoreland Dr., Idaho Falls, Id. 83402

[21] Appl. No.: 104,629

[22] Filed: Aug. 11, 1993

[51] Int. Cl.$^5$ ............................................. B65G 15/30
[52] U.S. Cl. ................... 198/844.2; 24/33 B; 24/33 K
[58] Field of Search ............... 198/844.2; 24/38, 33 B, 24/33 K, 31 R, 33 R, 33 P, 33 A

[56] References Cited

U.S. PATENT DOCUMENTS

| | | | |
|---|---|---|---|
| 2,999,284 | 9/1961 | McComb | 24/33 B |
| 4,625,369 | 12/1986 | Musil | 24/33 B |
| 5,097,944 | 3/1992 | Schick | 24/33 B X |
| 5,099,548 | 3/1992 | Loosli | 198/844.2 X |

FOREIGN PATENT DOCUMENTS

| | | | |
|---|---|---|---|
| 2743531 | 3/1979 | Germany | 198/844.2 |
| 0142638 | 7/1980 | Netherlands | 198/844.2 |
| 0270648 | 8/1989 | Netherlands | 198/844.2 |
| 0270649 | 8/1989 | Netherlands | 198/844.2 |

*Primary Examiner*—D. Glenn Dayoan
*Attorney, Agent, or Firm*—Aquilino & Welsh

[57] ABSTRACT

A belt splice for connecting the ends of a belt having a plurality of parallel rods. The belt splice includes a pair of belt connectors, each connector has a belt engaging end and a flexible joint engaging end. A flexible joint secured between the pair of connectors being made from rubber with a rigid pin embedded in each end. The rigid pins cooperating with fasteners to secure the connectors to the flexible joint.

15 Claims, 2 Drawing Sheets

QUICK SPLICE FOR BELT CONVEYOR

BACKGROUND OF THE INVENTION

The present invention relates to rod belt conveyors, and in particular to a belt splice for connecting the ends of a flexible belt having a plurality of parallel rods attached thereon.

A rod belt conveyor is used to convey and transport and often to size food products such as tomatoes, onions, potatoes and various other vegetables. The spacing between the parallel rods defines an opening which may be used for sizing to allow objects of a lesser size to pass through the rods while the larger products remain on top of the conveying rods.

A typical rod belt conveyor used in agricultural machines, such as harvesters or the like includes a plurality of transversely extending rods secured between side bands or belts. Typically, the ends of the rods are flattened and secured to the belts by suitable fasteners.

The belts are made from a flexible material such as heavy gauge fabric, reinforced rubber and/or neoprene. The belts form an endless loop and are driven by a suitable conveyor drive, such as gear wheels or drums. The drive engages the belt between the rods or it engages cutout teeth formed on the underside of the belts.

The ends of the belts are connected to form endless loops by suitable connectors. Examples of these connectors are shown in U.S. Pat. Nos. 4,815,587 and 4,625,369 to Musil, and in Applicant's prior U.S. Pat. No. 5,099,548.

Applicant's previous invention addressed the shortcomings of the prior art connectors, which tended to weaken the conveyor belt at the point of connection, as discussed in applicant's prior patent, U.S. Pat. No. 5,099,548, which is hereby incorporated by reference.

SUMMARY OF THE INVENTION

The present invention is an improved belt splice for connecting the ends of a flexible conveyor belt together to form an endless loop. The belt splice can be made in various lengths, and thus can be installed at the factory or in the field upon belt breakage.

The belt splice of the present invention includes a pair of upper plates and a pair of lower plates which are secured to the ends of a flexible joint assembly and to the ends of a belt to form first and second belt connectors with the flexible joint assembly secured therebetween.

It is an object of the invention to provide a belt splice which is quickly and easily attachable should breakage to the belt occur in the field while a crop is being harvested. The present invention accomplishes this objective by its unique design which allows it to be securely attached by a single fastener on each end of the belt. Further, the design is such that the belt splice may be attached without the requirement of drilling out the fasteners securing the flattened end of the rod to the belt.

It is also an object of the invention to provide a belt splice having no metal to metal moving parts, thus avoiding undue wear.

It is a further object of the invention to provide a belt splice which reduces or eliminates the breaking of the belt at the location of the splice.

Still another object is to provide a belt splice which is adjustable in length by a unique variable length flexible joint assembly in order to accommodate various sizes of belt breakage.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein, however, it is to be understood that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
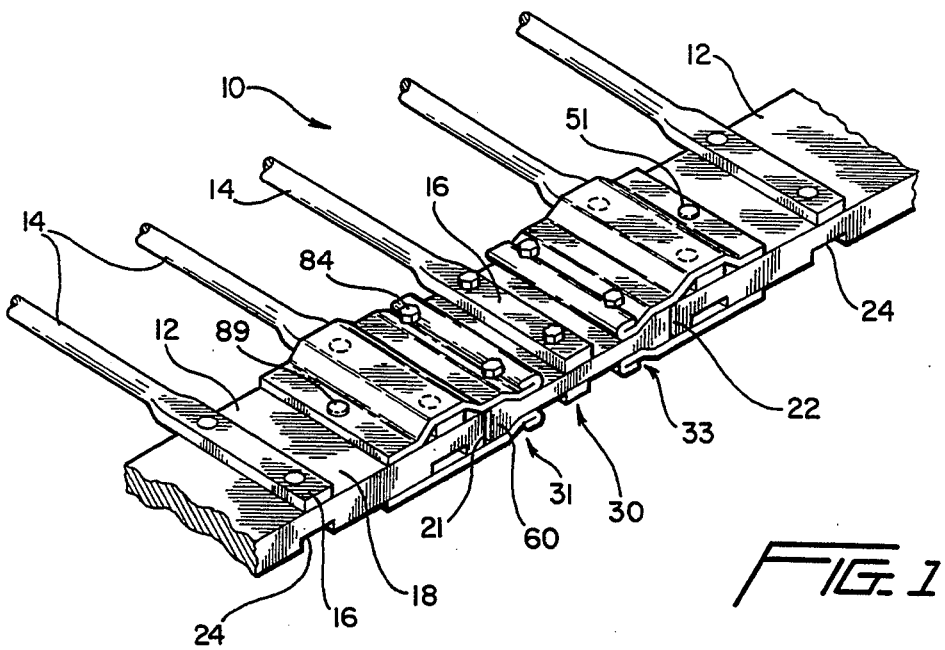
FIG. 1 is a perspective view of a fragmentary harvester belt attached together by a belt splice in accordance with the preferred embodiment of this invention.

Referring to the drawings, specifically FIG. 1, a partial section of a belted chain harvester 10 is shown, including a belt splice 30 in accordance with the present invention. The belted chain harvester 10 having a pair of conveyor belts 12, only one of which is shown. Each conveyor belt 12 having ends 21 and 22 which are joined together by belt splice 30 to form a continuous loop. Conveyor belt 12 is manufactured from a rubber material which may include a reinforcing material, such as high strength fibers, running through the belt. A series of spaced rods 14 having flattened ends 16 are secured to belt 12 by suitable fasteners, such as rivets 18. Slots 24 in the underside of belt 12 provide engagement means for any suitable drive arrangement.

Figure 2:
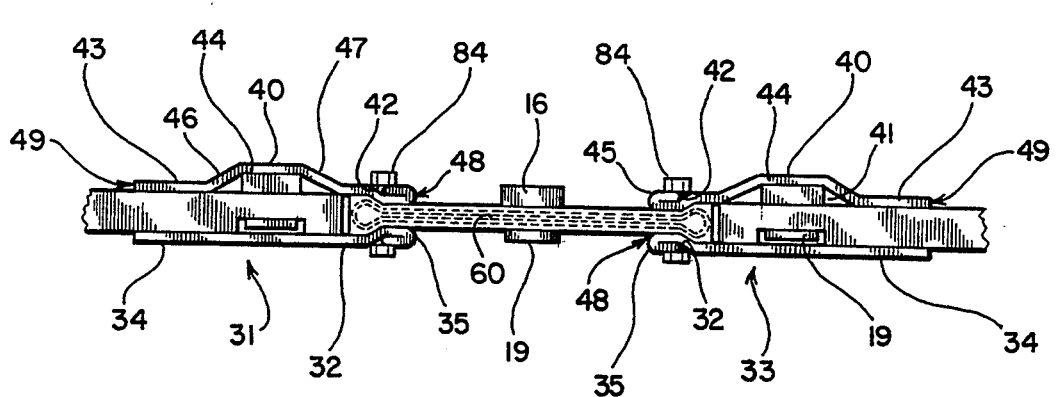
FIG. 2 illustrates a side view of the belt splice in accordance with the preferred embodiment.
Figure 3:
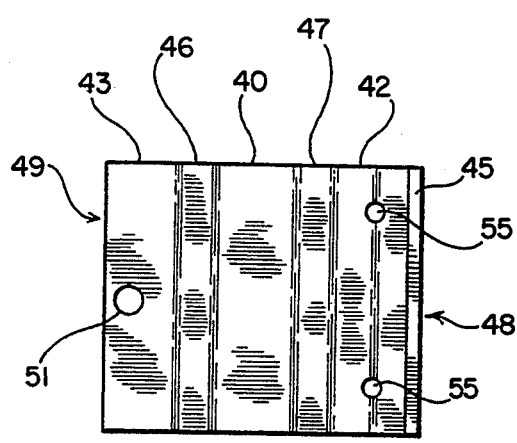
FIG. 3 is a top plane view of an upper plate in accordance with the preferred embodiment.
Figure 4:
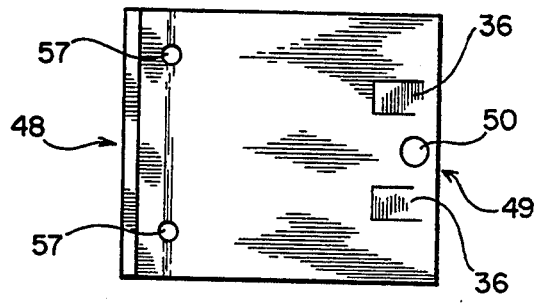
FIG. 4 is a bottom view of a lower plate in accordance with the preferred embodiment.

Belt splice 30 includes belt connectors 31 and 33, each of which include an upper plate 44 and a lower plate 34, as shown in FIG. 2. The connectors 31 and 33 having a distal belt securing end 49 and a proximal end 48 which is secured to a flexible joint assembly 60. The lower plates 34 are generally flat except near the proximal end 48 where they include an upwardly angularly bent portion 32. At the proximal end of lower plate 34 is a smooth joint engaging surface 35 formed by folding over the plate end. As can be seen in FIG. 4, lower plates 34 have securing tabs 36 which project upward therefrom to provide a more secure grip on the underside of belt 12. Upper plates 44 are similar in design to lower plates 34 in that near the proximal or joint engaging end 48, upper plates 44 have a downwardly bent portion 42 which corresponds to the bent portion 32 on the lower plates 34. The joint engaging end 48 of the upper plate is folded over upon itself, thus forming a smooth joint assembly engaging surface 45. Corresponding apertures 55 and 57 are located in upper plates 44 and lower plates 34 at angled portions 42 and 32, respectively. The apertures 55 and 57 receiving a fastener 83 which runs through holes in the ends of the flexible joint assembly 60 to clamp the flexible joint assembly 60 between the upper and lower plates 44 and 34. The remainder of each upper plate 44 is configured to have a rod receiving slot 41 formed by web 40 having angled sides 46 and 47. Fastener flange 43 extends from side 46 towards the distal end 49 and includes an aperture 51 which aligns with aperture 50 in the lower plate 34 for passing a fastener therethrough to secure each connector to a free end of belt 12.

Figure 7:
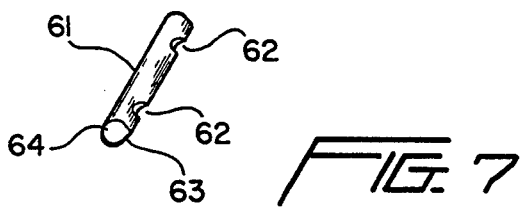
FIG. 7 is a detailed view of the unique pin used in the flexible joint assembly.

The flexible joint assembly 60 of the present invention is novel in its structural makeup and method of manufacture. The flexible joint 60 is manufactured from a rubber material and includes a pin 61 located in both ends thereof. The pin 61 shown in FIG. 7 is generally circular, as indicated at 64, except for the angular face 63. Located in the angular face 63 are cutouts 62. Cutouts 62 are generally semicircular, as their purpose is to cooperate with fastener 83 when securing the flexible joint assembly 60 to connectors 31 and 33.

The flexible joint assembly 60 is generally of a dumbbell-type cross-section having a middle section 65 with a substantially constant cross-sectional dimension and ends 67,68 with enlarged cross-sectional dimensions due to the placement of the pins 61 therein.

Figure 5:
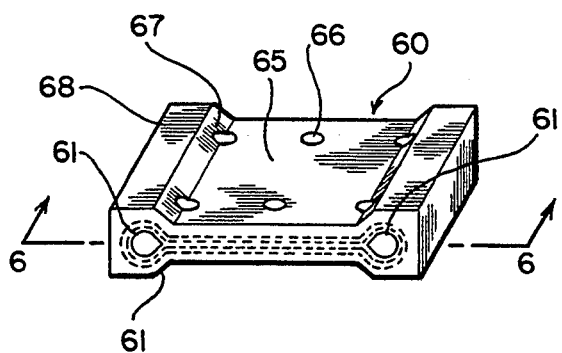
FIG. 5 illustrates a more detailed view of the flexible joint assembly.
Figure 6:
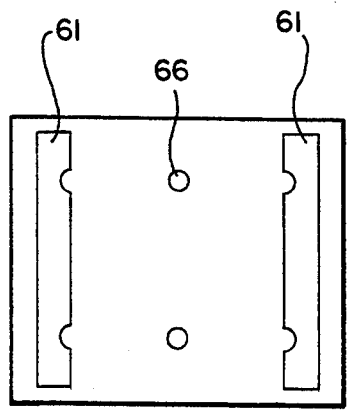
FIG. 6 represents a cross-section taken at line 6—6 in FIG. 5.

As shown in FIG. 5, the middle section 65 may include two apertures 66 which are for receiving fasteners in order to secure flattened end 16 of a rod 14 to the joint assembly 60. Extending from middle section 65 are upper and lower angled sections 67 which continue into flat sections 68 forming the ends of the joint assembly 60. The cross-sectional configuration of the flexible joint assembly 60 is a direct result of the design and location of pins 61.

When manufacturing the joint assembly 60, the pins 61 are held in place and then wrapped in rubber, indicated at 70. Next, a reinforcing fiber 71 is wound around the rubber 70 in a first angular direction. Then, another layer of rubber 72 is placed about the fiber layer 71, which is then wrapped with a fiber 73 at the second angular direction. The second fiber layer 73 in the preferred embodiment being wound at an angle which is essentially equal and opposite to the first angular direction. The joint assembly at this stage is then covered with rubber layer 74, placed in a mold and cured.

Figure 8:
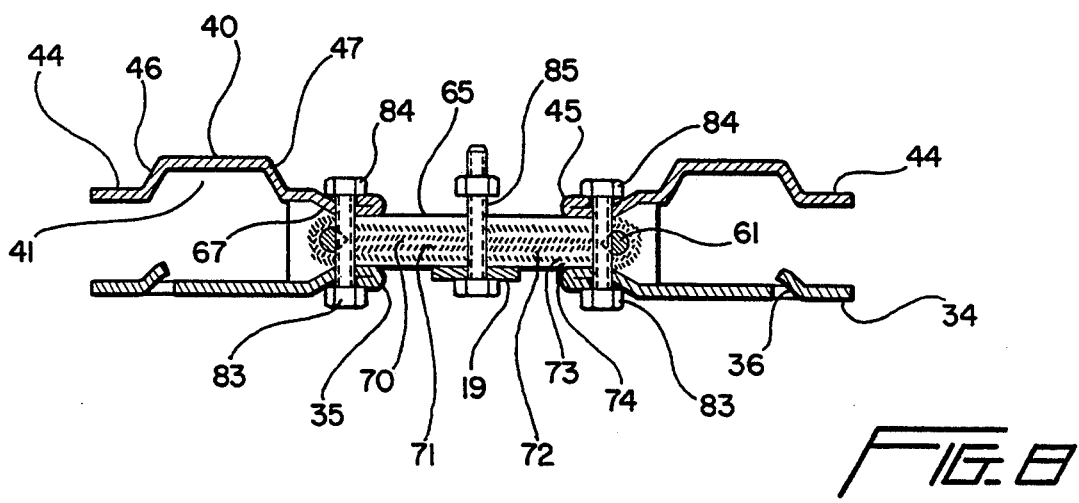
FIG. 8 is a cross-sectional view of the belt splice.
Figure 9:
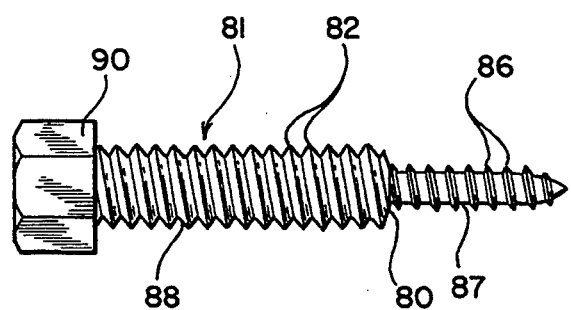
FIG. 9 is a more detailed view of the threaded fastener used with the present invention.

The flexible joint assembly 60 is attached to belt connectors 31, 33 by threaded fasteners 83, as best seen in FIG. 8. Fasteners 83 extend through apertures 57 in lower plates 34, up through joint assembly 60 such that fasteners 83 fit within cutouts 62, and then through apertures 55 in upper plates 44. Nuts 84 are then threaded on to the ends of fasteners 83 and tightened to clamp the ends of flexible joint assembly 60 between the upper plates 44 and lower plates 34.

As best viewed in FIG. 2, the angled portions 42 and 32 of the upper and lower plates mate with the angle section 67 of the joint assembly, thus the angle at which portions 42 and 32 are bent depends upon the angle of the joint assembly sections 67. The design of the corresponding angled portions 32, 42, and angled sections 67 and the feature of embedded pins 61 provide enhanced structural integrity between the connectors 31, 33 and the joint assembly 60. The threaded fasteners 83 are prevented from ripping through the joint assembly 60 because of pins 61. The pins function to spread the force exerted on the fasteners 83 over the width of the flexible joint assembly while the mating angled portions 32, 42 and sections 67 allow the longitudinal pulling forces on the plates to be spread along the width of the joint assembly. The fibers 71 and 73 wound around the pins 61 aid in spreading the forces exerted by the pins 61 throughout the entire length and width of the flexible joint 60.

The length of the flexible joint assembly 60 can vary by merely changing the length of middle section 65 when molding the flexible joint assembly. Thus, the splice can be used to repair various lengths of belt breakage.

Middle section 65 is shown with two apertures 66, however, the number of apertures 66 will depend upon the number of rods 14 which need to be attached thereto in order to maintain proper rod spacing. The flattened ends 16 are attached by means of a fastener 85 and backing plate 19. Fastener 85 is similar in design to fasteners 83.

In use, the belt splice 30 would be fully assembled, therefore, all one needs to do is cut the ends of the belt 12 such that a flattened rod end 16 is aligned with web 40 in each connector 31, 33. The ends of the belt 12 can then be slid between upper plates 44 and lower plates 34 such that the rod end 16 is positioned within web 40. Next, threaded fasteners 81, specifically designed to penetrate rubber belts, are inserted through apertures 50 through the belt ends 21, 22 and then through apertures 51. Once the fasteners 81 extend through apertures 51, a nut 89 is placed thereon and tightened to securely clamp the ends 21 and 22 between upper plates 44 and lower plates 34.

The specially designed fasteners 81 have a penetrating portion 87 with screw-like threads 86 thereon and a bolt-like portion 88 with machine threads 82 thereon and a head 90. The fastener 81 is screwed through the rubber belt and the screw-like threads 86 act to pull the bolt-like portion 88 through the belt. The penetrating portion 87 being sized to enable a nut 89 to be slipped over the penetrating portion 87 to threadedly engage the bolt portion 88. The penetrating portion 87 is connected to the bolt-like portion 88 at 80. The connection at 80 is such that the penetrating portion 87 may easily be removed from the bolt-like portion 88 after belt penetration.

All of the fasteners 81, 83 and 85 used in conjunction with the improved belt splice are of the type mentioned above. This special fastener eliminates the need for a drill and provides a hole which is less harmful to the belt strength or flexible joint strength, as the screw threaded penetrating portion 87 does not cut the reinforcing fibers in the manner of a drill bit but merely moves them out of the way.

While various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A belt splice for connecting the ends of a conveyor belt together to form a endless loop comprising:
   a pair of belt connectors wherein each connector includes a lower plate and an upper plate having apertures therein which are aligned with one another;

a flexible joint assembly secured between said connectors wherein said flexible joint assembly is made from a rubber material and includes a rigid pin embedded in each end thereof having at least one cutout therein; and, fastener means for securing the ends of said flexible joint assembly between corresponding upper and lower plates wherein said fastener means cooperates with said cutout in said pins and said apertures in said plates.

2. The invention of claim 1 wherein said rubber material is reinforced with fibers running at different angles relative to one another.

3. The invention of claim 1 wherein said pins are made from a metallic material.

4. The invention of claim 1 wherein said pins include a round face and angular face.

5. The invention of claim 4 wherein said cutouts are semicircular and are located in said angular face of each pin.

6. The invention of claim 1 wherein said upper plates having a rod receiving slot and a fastener flange extending from said slot.

7. The invention of claim 1 wherein said fastener means includes bolts with screw threaded ends which are removable and a nut which threads onto each bolt.

8. The invention of claim 1 wherein said upper and lower plates include an angular bent portion cooperating with an angular section of said flexible joint assembly.

9. The invention of claim 1 wherein said apertures in said plates are located on said angular bent portions.

10. The invention of claim 1 wherein the ends of said upper and lower plates which engage said flexible joint assembly are rounded to form a smooth surface.

11. A flexible joint assembly adapted to be connected between two belt connectors comprising:

a block of rubber material with rigid pins embedded in opposite ends thereof; and, said pins including at least one semicircular cutout therein.

12. The invention of claim 11 wherein said rubber material is reinforced with fibers running at different angles relative to one another.

13. The invention of claim 11 wherein said pins are made from a metallic material.

14. The invention of claim 11 wherein said pins include a round face and angular face.

15. The invention of claim 14 wherein said cutouts are located in said angular face of each pin.

* * * * *